(12) United States Patent
Roszak et al.

(10) Patent No.: US 10,778,666 B2
(45) Date of Patent: Sep. 15, 2020

(54) CO-EXISTENCE OF MANAGEMENT APPLICATIONS AND MULTIPLE USER DEVICE MANAGEMENT

(71) Applicant: VMware, Inc., Palo Alto, CA (US)

(72) Inventors: Jason Roszak, Brookhaven, GA (US); Varun Murthy, Atlanta, GA (US); Shravan Shantharam, Cumming, GA (US); Blake Watts, St. George, UT (US); Kalyan Regula, Alpharetta, GA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/526,002

(22) Filed: Jul. 30, 2019

(65) Prior Publication Data

US 2019/0392135 A1 Dec. 26, 2019

Related U.S. Application Data

(63) Continuation of application No. 15/373,603, filed on Dec. 9, 2016, now Pat. No. 10,395,027.

(51) Int. Cl.
*H04L 29/06* (2006.01)
*G06F 21/56* (2013.01)
(Continued)

(52) U.S. Cl.
CPC .............. *H04L 63/08* (2013.01); *G06F 9/485* (2013.01); *G06F 21/10* (2013.01); *G06F 21/50* (2013.01);
(Continued)

(58) Field of Classification Search
CPC .......... G06F 21/52; G06F 9/485; G06F 21/50; G06F 21/62; G06F 21/56; G06F 21/10; H04L 63/08; H04L 67/34
See application file for complete search history.

(56) References Cited

U.S. PATENT DOCUMENTS 8,695,060 B2 * 4/2014 Wade ...................... G06F 21/54
726/1
9,330,254 B1 5/2016 Xue
(Continued)

OTHER PUBLICATIONS

VMWare, "How to configure Advanced Staging (Enroll on behalf of another user)", Feb. 24, 2016, https://communities.vmware.com.*
(Continued)

*Primary Examiner* — Ramy M Osman
(74) *Attorney, Agent, or Firm* — Thomas | Horstemeyer, LLP

(57) ABSTRACT

Various examples for performing automated enrollments of client devices with a management service after being accessed by a staging user account are described. A client device can be configured to identify a user account active on the client device and determine whether the user account is a staging user account or an end user account associated with an intended recipient of the client device. In an instance in which the user account is the staging user account, the client device can create an event listener on the client device that monitors a subsequent login of a user account performed through an operating system of the client device, the subsequent login of the user account being the end user account. In an instance in which the subsequent login of the user account is detected by the event listener, the client device can perform an automated enrollment with a remote management service.

20 Claims, 6 Drawing Sheets

(51) Int. Cl.
  *G06F 21/10* (2013.01)
  *G06F 21/52* (2013.01)
  *G06F 21/50* (2013.01)
  *G06F 21/62* (2013.01)
  *H04L 29/08* (2006.01)
  *G06F 9/48* (2006.01)

(52) U.S. Cl.
  CPC .............. *G06F 21/52* (2013.01); *G06F 21/56* (2013.01); *G06F 21/62* (2013.01); *H04L 67/34* (2013.01)

(56) References Cited

U.S. PATENT DOCUMENTS

| | | | |
|---|---|---|---|
| 9,503,452 B1* | 11/2016 | Kumar | H04L 67/306 |
| 9,577,985 B2 | 2/2017 | Deasy et al. | |
| 10,637,957 B2* | 4/2020 | Shantharam | H04L 67/34 |
| 2002/0092003 A1 | 7/2002 | Calder et al. | |
| 2004/0237071 A1 | 11/2004 | Hollander et al. | |
| 2006/0016776 A1 | 7/2006 | Mitsuhashi | |
| 2007/0174846 A1 | 7/2007 | Johnson et al. | |
| 2008/0301663 A1 | 12/2008 | Bahat et al. | |
| 2011/0093953 A1 | 4/2011 | Kishore et al. | |
| 2011/0239227 A1 | 9/2011 | Schaefer et al. | |
| 2012/0072494 A1* | 3/2012 | Wong | G06F 16/958 709/204 |
| 2014/0007193 A1 | 1/2014 | Qureshi et al. | |
| 2014/0245396 A1* | 8/2014 | Oberheide | H04L 63/08 726/4 |
| 2015/0106891 A1* | 4/2015 | Soni | H04L 63/0861 726/6 |
| 2015/0106946 A1 | 4/2015 | Soman et al. | |
| 2015/0365405 A1* | 12/2015 | Kalinichenko | H04L 63/08 726/3 |
| 2016/0359862 A1 | 12/2016 | Riva et al. | |
| 2017/0177999 A1* | 6/2017 | Novik | G06F 21/316 |
| 2018/0167491 A1 | 6/2018 | Roszak et al. | |
| 2018/0276001 A1* | 9/2018 | Roszak | H04L 67/34 |
| 2018/0276386 A1* | 9/2018 | Roszak | G06F 21/575 |
| 2019/0149405 A1* | 5/2019 | Verma | H04L 67/34 709/222 |
| 2019/0392135 A1* | 12/2019 | Roszak | G06F 21/56 |

OTHER PUBLICATIONS u/ChristopherY5, "SCCM vs AirWatch", Apr. 22, 2018, Reddit, https://www.reddit.com/r/SCCM/comments/8e5i1x/sccm_vs_airwatch/.

Peppin, Brooks, "Enabling Co-Management with SCCM and AirWatch", Mar. 2018, Brooks Peppin Blog (archived), http://web.archive.org/web/20180803234748/https://brookspeppin.com/blog/enabling-co-management-with-sccm-and-airwatch.

Tangoman 1, "SCCM Client & "Enroll in to device management" setting", Jan. 19, 2016, MS TechNet, https://social.technet.microsoft.com/Forums/en-US/a5ccc7eb-97c5-438b-adc6-c13abbf094ab/sccm-client-amp-quotenroll-in-to-device-managementquot-setting?forum=configmanagermdm.

Shailendra Dev, "Sccm Integration with Airwatch Mom", Apr. 1, 2015, Ms TechNet, https://social.technelmicrosoft.com/ 7oru ms/en-US/86c5ea55-19b0-4a35-aa8c-7a016a39t756/sccm-i ntegration-with-airwatch-mdm? brum=contigmanagermdm.

* cited by examiner

CO-EXISTENCE OF MANAGEMENT APPLICATIONS AND MULTIPLE USER DEVICE MANAGEMENT

CROSS-REFERENCE TO RELATED APPLICATION

This application is a continuation of U.S. patent application Ser. No. 15/373,603 entitled "CO-EXISTENCE OF MANAGEMENT APPLICATIONS AND MULTIPLE USER DEVICE MANAGEMENT," filed Dec. 9, 2016, the contents of which being incorporated by reference in their entirety herein.

BACKGROUND

With the emergence of bring-your-own-device (BYOD) technology in the workplace, enterprises permit employees or other personnel to use their own devices for business purposes. This can include accessing enterprise data, such as email and corporate documents. However, prior to an employee using his or her own device in the workplace, an enterprise can require the employee to enroll with a management service capable of protecting enterprise data accessible through a device from theft, data loss, and unauthorized access. Administrators of the management service can utilize the management service to oversee operation of the devices enrolled with or otherwise managed by the service.

Various operating systems do not permit or provide capabilities for multiple management applications to exist on a single device. For instance, System Center Configuration Manager (SCCM) is a device management application offered by Microsoft® capable of evaluating, deploying, and updating devices in enterprise environments. However, upon installation on a device, SCCM updates the registry of the device to prevent other management applications from performing management functions. For instance, SCCM may make application programming interface (API) calls to an operating system of the device to terminate any other management services executing on the device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
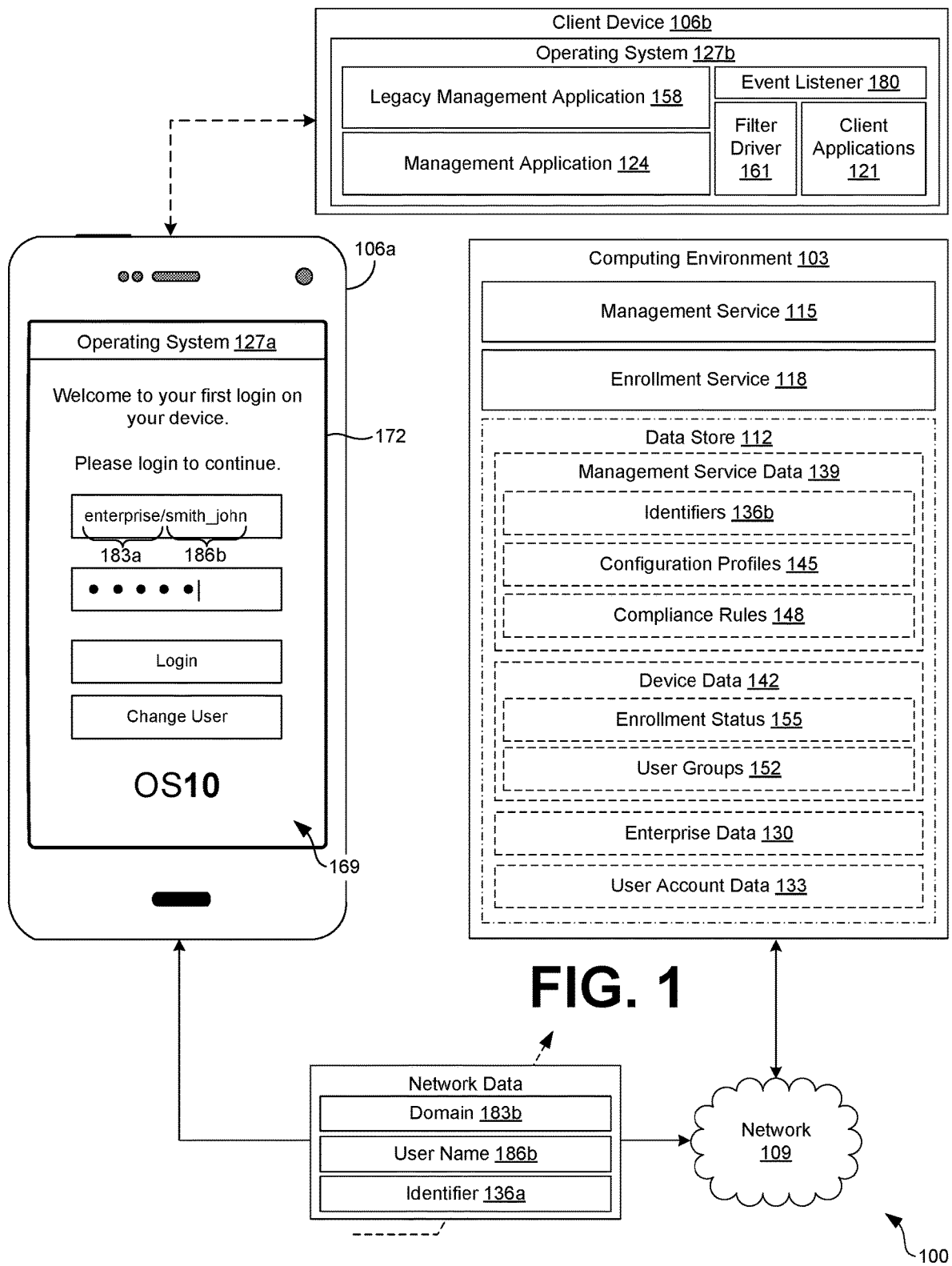
FIG. 1 is a drawing of a networked environment including a management service, an enrollment service, and a client device.

Aspects of the present disclosure relate to co-existence of multiple management applications on devices, automation of device enrollment, and enrollment management for multiple users on a single device.

In some situations, it can be problematic for an administrator to transition from a first type of management application to another in a single instance. For example, many problems can arise transitioning from a legacy management application to a new management application. For instance, device management policies covered by each management application may differ. It can be beneficial to have two management applications co-existing on a device while reliance on an older one of the management applications is phased out. However, particular legacy management applications, such as SCCM, prevent other management applications from performing management functions on the same device. For instance, if a new management application were installed on a device having SCCM, SCCM programmatically requests that the operating system of the device terminate execution of the new management application. Having two management applications on a single device thus remains problematic.

According to one example, a client device can be configured to identify that a first management application (e.g., a legacy management application) installed on the client device has management privileges with an operating system of the client device, where the first management application is configured to generate a terminate command in response to detection of a second management application (e.g., a newly installed management application). The terminate command can be intercepted prior to a receipt of the command by the operating system such that the operating system does not terminate execution of the second management application on the client device.

The terminate command can be intercepted, for example, by one of the second management application, a sleeper agent application, or a driver installed on the client device that filters predefined application programming interface (API) calls made by the first management application. A response can be communicated to the first management application in response to the terminate command being intercepted as if the terminate command had been received by the operating system, a process referred to as "spoofing." Additionally, when an administrator desires to fully transition from use of the first management application to the second management application, the first management application can be uninstalled or removed from the client device.

Moving on, in some situations, an enterprise can require its employees, contractors, clients, or other personnel to enroll BYOD devices with a management service that implements policies on the devices to protect data from theft, data loss, and unauthorized access. Having personnel download, install, and configure a management application that enrolls the device with the management service can be complicated and problematic. Hence, many enterprises have administrators configure the devices before they are provided to their personnel. Configuration of the devices can be accomplished by provisioning a device or using image management, where a new image is installed on a device. Provisioning can be employed to configure devices without imaging. For instance, provisioning allows an administrator to stage a "shrink-wrapped" device with applications, policies, and other material before the device is provided to an end user. In examples described herein, a device can be provisioned by an administrator such that, when received and accessed by an end user, the device automatically enrolls with a management service without the end user having to provide login credentials in a management application. Instead, the login credentials of the operating system can be employed.

In one example, an administrator can provision a device for an end user by installing a management application on the device. Upon execution of the management application, the management application can recognize that a user executing the management application is a staging user, such as an administrator or other user provisioning the device. The management application can generate an event listener that monitors at least one subsequent login of a user account performed through an operating system of the client device. For instance, when the device is received by the end user, the event listener will monitor the login to the operating system performed by the end user. During the subsequent login, a domain and a user name can be identified by the event listener and communicated to a management service for enrollment of the device. For example, the computing environment can use the domain to identify an enterprise account and generate a new user account or locate an existing user account for the end user. An identifier that uniquely identifies the device can be stored in a data store in association with the user account.

With reference to FIG. 1, shown is an example of a networked environment 100. The networked environment 100 can include a computing environment 103 and a client device 106a . . . 106b, in communication with one another over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement. The computing devices can be located in a single installation or can be distributed among many different geographical locations. The computing environments 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 106 remotely over the network 109, the computing environment 103 can be described as a "remote" computing environment 103.

The computing environment 103 can include a data store 112. The data store 112 can include memory of the computing environment 103, mass storage resources of the computing environment 103, or any other storage resources on which data can be stored by the computing environment 103. The data stored in the data store 112, for example, can be associated with the operation of the various applications or functional entities described below.

The components executed on the computing environment 103 can include, for example, a management service 115, an enrollment service 118, as well as other applications, services, processes, systems, engines, or functionality not discussed in detail herein. The management service 115 can be executed to oversee the operation of client devices 106 enrolled with the management service 115. In some embodiments, an enterprise, such as one or more companies or other organizations, can operate the management service 115 to oversee or manage the operation of the client devices 106 of its employees, contractors, customers, or other users having user accounts with the management service 115.

The management service 115 can cause various software components to be installed on a client device 106. Such software components can include, for example, client applications 121, resources, libraries, drivers, device configurations, or other similar components that require installation on the client device 106 as specified by an administrator of the management service 115. The management service 115 can further cause policies to be implemented on a client device 106.

Policies can include, for example, restrictions or permissions pertaining to capabilities of a client device 106 such that access to enterprise data is secured on the client device 106. For example, a policy can include providing access to enterprise data when a client device 106 is in a particular location of an office building during a predefined time window (e.g., between 9:00 AM and 5:00 PM). Also, the policy can include denying access to enterprise data when the client device 106 is not in the location of an office building or outside a time of the predefined time window. Policies can further include enabling or disabling certain functions on the client device 106. In one example, a policy can deny camera or audio recording functions when the client device 106 is at a particular location. Other policies can be implemented, as can be appreciated. The policies can be configured by the administrator depending on the interests or security policies of the enterprise.

The management service 115 can interact with one or more client applications 121 executed on the client device 106. In one example, the management service 115 interacts with a management application 124 on the client device 106 to enroll the client device 106 with the management service 115. When enrolled, the management application 124 can be registered as a device administrator of the client device 106, which can provide the management application 124 with sufficient privileges to control the operation of the client device 106. In one example, the management application 124 can be registered as the device administrator through the installation of a management profile at the operating system of the client device 106 that causes an operating system 127a . . . 127b of the client device 106 to designate the management application 124 as the device administrator.

The management service 115 can direct the management application 124 to perform device management functions on the client device 106. For example, the management service 115 can direct the management application 124 to control access to certain software or hardware functions available on the client device 106. As a result, the management service 115 can verify that the configuration and operation of the client device 106 is in conformance with predefined criteria that ensures that enterprise data, or other data, is protected from data loss, unauthorized access, or other harmful events.

The management service 115 can further provision enterprise data 130 to the client device 106 through the management application 124. In one example, the management service 115 can cause the management application 124 to control use of the client device 106 or provision enterprise data 130 to the client device 106 through use of a command queue provided by the management service 115. In some examples, the management service 115 can store commands in a command queue associated with a particular client device 106 and can configure the management application 124 executed by the client device 106 to retrieve the contents of the command queue. In another example, the management application 124 can be configured to retrieve the contents of the command queue on a configured interval, such as every four hours, or upon detection of a certain event, such as detection of an unauthorized application being executed by the client device 106.

In any case, the management application 124 can retrieve the contents of the command queue by checking in with the management service 115 and requesting the contents of the command queue. In one example, the contents of the command queue can include a command that the management application 124 should cause to be executed on the client device 106. In another example, the contents of the command queue can include a resource or client application 121 that the management application 124 should cause to be installed on the client device 106, which the client device 106 may access through a specified uniform resource locator (URL).

The enrollment service 118 is executed to enroll the client device 106 with the management service 115, such that the management service 115 can oversee configuration and management of the client device 106. To this end, the enrollment service 118 can maintain user account data 133 for users of the client devices 106. The user account data 133 can include, for example, a username, an email address, a password, biometric information, or other authentication data. Additionally, the enrollment service 118 can maintain a mapping of an identifier 136*a* . . . 136*b* that uniquely identifies a client device 106 for a user account.

The data stored in the data store 112 can include, for example, management service data 139, device data 142, enterprise data 130, and user account data 133, as well as other data. The management service 115 includes information pertaining to management of the client devices 106 enrolled with the management service 115. To this end, the management service data 139 can include, for example, identifiers 136, configuration profiles 145, compliance rules 148, as well as other data.

Configuration profiles 145 include settings specified by an administrator of the management service 115 for configuration of individual ones of the client devices 106. For instance, the configuration profiles 145 can indicate particular client applications 121, drivers, or other software components to be installed on the client device 106. Additionally, the configuration profiles 145 can include other settings for the client device 106. Configuration of the client device 106 can be performed by the management application 124, as specified by an applicable configuration profile 145. Through an administrator console, an administrator can create a configuration profile 145 for a client device 106, a group of client devices 106, or a user group 152. As can be appreciated, some client devices 106 can be configured differently than other client devices 106. In some examples, a configuration profile 145 can include an extensible markup language (XML) document, or other suitable type of file, that can be communicated to the client device 106 or otherwise accessed by the management application 124.

The compliance rules 148 can include constraints specified by an administrator for a client device 106 to be in "compliance" with the management service 115. The compliance rules 148 can include criteria specified by the administrator or other criteria. In one example, the management application 124 can configure hardware or software functionality of a client device 106 such that the client device 106 is in conformance with the compliance rules 148. For instance, an administrator can specify particular types of software updates that are automatically installed on the client devices 106. Additionally, the management application 124 can identify when the client device 106 is not in conformance with the compliance rules 148, as well as other policies, and can take appropriate remedial actions, such as denying access to enterprise data 130, denying installation of a software update, or other features of the management application 124.

In some examples, the management service 115 communicates with the management application 124 or other client application 121 executable on the client device 106 to determine whether vulnerabilities exist on the client device 106 that do not satisfy compliance rules 148. Vulnerabilities can include, for example, the presence of a virus or malware on the client device 106, the client device 106 being "rooted" or "jailbroken" where root access is provided to a user of the client device 106, the presence of particular applications or files, questionable device configurations, vulnerable versions of client applications 121, or other vulnerability as can be appreciated.

Device data 142 can include, for example, data pertaining to an enrollment status 155 for individual ones of the client devices 106. In one example, a client device 106 designated as "enrolled" can be permitted to access the enterprise data 130 while a client device 106 designated as "not enrolled," having no designation, or "enrolled" but not in compliance with the compliance rules 148 can be denied access to the enterprise data 130. Device data 142 can also include data pertaining to user groups 152, which can include groups of client devices 106 belonging to an organizational unit, such as information technology (IT), sales, marketing, or other appropriate arrangement for an enterprise or organization. An administrator can specify one or more of the client devices 106 as belonging to a particular user group 152 through an administrator console.

The client device 106 can be representative of one or more client devices 106. The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include an operating system 127 configured to execute various client applications 121, such as the management application 124, a legacy management application 158, or other application. The client device 106 can also include drivers, such as device drivers or software drivers, that operate or control hardware devices coupled to the client device 106 or software installed thereon. The drivers can include a filter driver 161 installed by the management application 124, as will be described. Some client applications 121 can access network content served up by the computing environment 103 or other servers, thereby rendering a user interface 169 on a display 172, such as a liquid crystal display (LCD), touch-screen display, or other type of display device. To this end, some client applications 121 can include a browser or a dedicated application, and a user interface can include a network page, an application screen, or other interface. Further, other client applications 121 can include device management applications, enterprise applications, social networking applications, word processors, spreadsheet applications, media viewing applications, or other applications.

Next, a general description of the operation of the various components of the networked environment 100 is provided. In some situations, an enterprise may desire to transition from a first type of management application to another. For instance, an enterprise may desire to phase out use of a legacy management application 158 operated by one entity in favor of a management application 124 operated by a second entity. Removing the legacy management application 158 from a client device 106 and installing a management application 124 in a single instance can be problematic as the client device 106 can be vulnerable during the transition or due to complexities associated with the different policies implemented by the legacy management application 158 versus the management application 124. Accordingly, it can be beneficial to have both the legacy management application 158 and the management application 124 co-existing on the client device 106 while use of the legacy management application 158 is phased out. However, particular types of the legacy management application 158, such as SCCM, prevent other management applications from performing management functions on the client device 106. For instance, if the management application 124 were installed on a device having SCCM, SCCM programmatically requests that the operating system 127 of the client device 106 terminate execution of the management application 124 at periodic intervals or upon detection of a management event.

Accordingly, the management application 124 installed on the client device 106 can be configured to identify that a legacy management application 158 is installed on the client device 106 and has management privileges with the operating system 127 of the client device 106. As noted above, the legacy management application 158 may prevent operation of the management applications 124 on the client device 106, for example, by generating a terminate command periodically or in response to detection of the management application 124.

The management application 124 can thus intercept the terminate command generated by the legacy management application 158 prior to a receipt of the command by the operating system 127 such that the operating system 127 does not terminate execution of the management application 124. In one example, the terminate command can be intercepted by one of the management application 124. In another example, a sleeper agent application or a filter driver 161 can be installed on the client device 106 to monitor predefined API calls made by the legacy management application 158, where the API calls are used to instruct the operating system 127 or other component to terminate execution of the management application 124.

One of the management application 124, the sleeper agent application, or the filter driver 161 can generate and communicate a response to the legacy management application 158 as if the terminate command had been received by the operating system 127. Additionally, when an administrator desires to fully transition from use of the legacy management application 158 to the management application 124, the legacy management application 158 can be uninstalled or removed from the client device 106 by the management application 124.

Additionally, many enterprises have administrators configure client devices 106 before they are shipped or otherwise provided to personnel. The client devices 106 can be configured using provisioning or image management. Image management generally includes installing a preconfigured image on a client device 106 and then providing the client device 106 to personnel. However, the level of customization is low as a new image has to be generated for each different configuration. Provisioning, on the other hand, can be employed to configure devices without imaging. For instance, provisioning allows an administrator to stage a shrink-wrapped device with client applications 121, policies, resources, and other material before the client device 106 is provided to an end user. In some examples, a client device 106 can be provisioned by an administrator of an enterprise or the management service 115 such that, when received and accessed by an end user, the client device 106 is automatically enrolled with the management service 115. In this scenario, the end user does not have provide login credentials or other sophisticated information, such as domain, internet protocol (IP) addresses, or similar information, through the management application 124 to enroll with the enrollment service 118. Instead, the login credentials of the operating system 127 can be employed, as shown in the client device 106a of FIG. 1.

In one example, an administrator can provision the client device 106 for an end user by installing the management application 124 on the client device 106. Upon execution of the management application 124, the management application 124 can identify a current user of the operating system 127 and, through communication with the computing environment 103, determine that the user executing the management application 124 is a staging user, such as an administrator or other user provisioning the device. The management application 124 can create an event listener 180 in the client device 106 that monitors at least one subsequent login of a user account performed through the operating system 127 of the client device. For instance, when the client device 106 is received by the end user, the event listener 180 can monitor the login to the operating system 127 performed by the end user. For instance, as shown in the user interface 169 of FIG. 1, the operating system 127 can require an end user to provide a username, password, or other information before providing the end user with access to a desktop of the operating system 127 or to other features of the client device 106.

During the login, a domain 183a . . . 183b and a user handle 186a . . . 186b can be identified by the event listener 180 and communicated to the enrollment service 118 for enrollment of the client device 106 with the management service 115. For example, the enrollment service 118 can use the domain 183 to identify an enterprise account corresponding to an enterprise, organization, or other entity from the data store 112. Using the enterprise account, the enrollment service 118 can locate an existing user account for the end user from the user account data 133 or generate a new user account. The event listener 180 can also access an identifier 136 that uniquely identifies the client device 106 that can be stored in the data store 112 in association with the user account. In one example, the identifier 136 is obtained from a registry of the operating system 127.

Figure 2A:
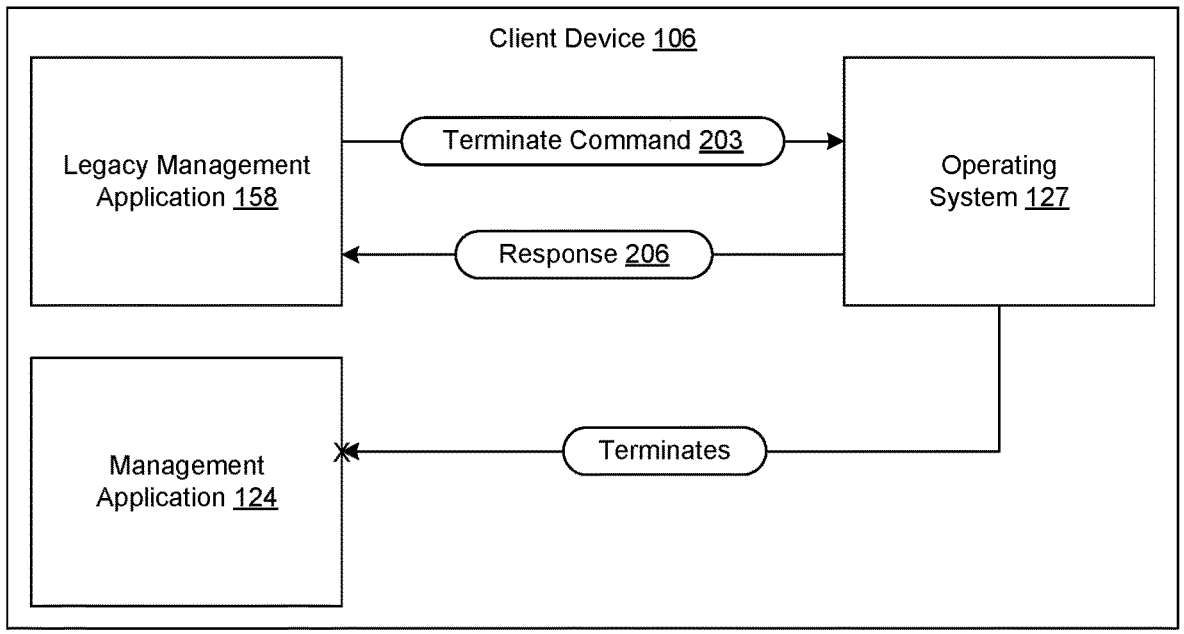
FIGS. 2A and 2B are drawings of schematic diagrams of a client device having a legacy management application and management application stored thereon.
Figure 2B:
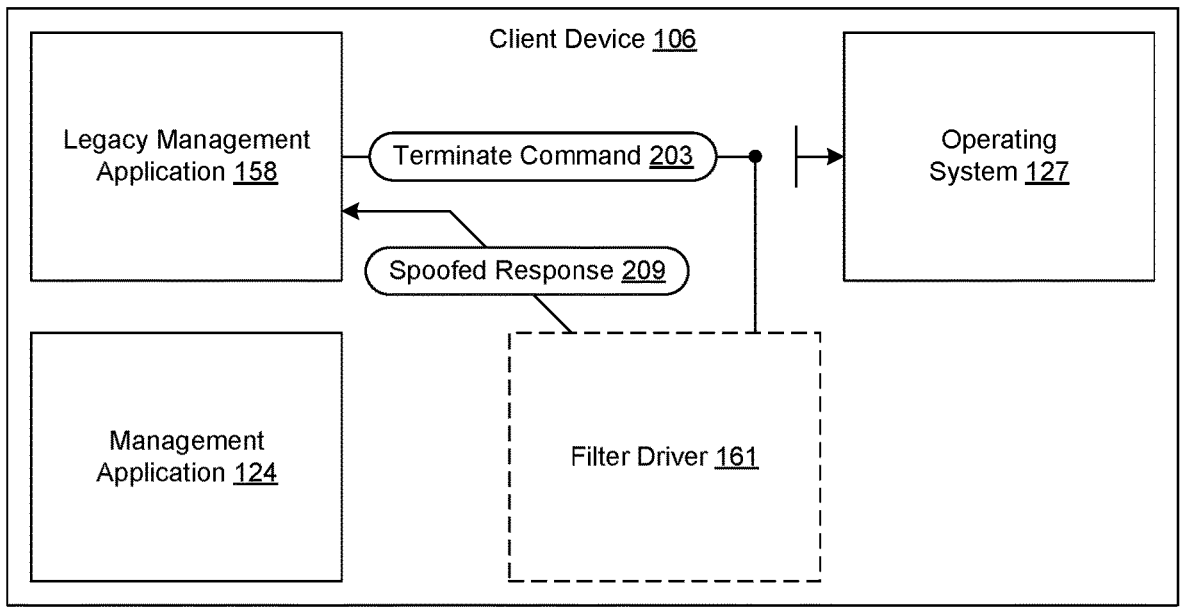

Referring next to FIGS. 2A and 2B, shown are schematic diagrams 200a . . . 200b illustrating multiple management applications on a single client device 106. Referring first to FIG. 2A, a client device 106 is shown having a legacy management application 158 and a management application 124 installed thereon. The legacy management application 158, however, may be configured to prevent operation of the management applications 124 on the client device 106, for example, by generating a terminate command 203 periodically or in response to detection of the management application 124. The terminate command 203 can include, for example, an API or function call. For instance, the terminate command 203 can include the TerminateProcess( ) or similar function:

```
BOOL WINAPI TerminateProcess(
    _In_ HANDLE hProcess,
    _In_ UINT    uExitCode
);
```

Upon receipt of the terminate command 203, the operating system 127 can terminate execution of the management application 124. Thereafter, the operating system 127 can send a response 206 to the legacy management application 158. The response 206 can indicate, for example, that the execution of the management application 124 was successfully terminated.

Referring next to FIG. 2B, the management application 124 can install a filter driver 161 on the client device 106. In some examples, the filter driver 161 can intercept the terminate command 203 generated by the legacy management application 158 prior to a receipt of the terminate command 203 by the operating system 127. As a result, the operating system 127 does not terminate execution of the management application 124, as opposed to the scenario described with respect to FIG. 2A. In other examples, the terminate command 203 can be intercepted by one of the management application 124 or a sleeper agent application installed on the client device 106. The sleeper agent application can include a background process or service that, similar to the filter driver 161, monitors predefined API calls made by the legacy management application 158. For instance, the sleeper agent application can monitor API calls used to instruct the operating system 127 or other component to terminate execution of the management application 124.

The filter driver 161 can generate and communicate a spoofed response 209 to the legacy management application 158 as if the terminate command had been received by the operating system 127 and successfully accomplished. Additionally, when an administrator desires to fully transition from use of the legacy management application 158 to the management application 124, the legacy management application 158 can be uninstalled or removed from the client device 106 by the management application 124. In one example, the management application 124 can generate a command line argument that instructs the operating system 127 to initiate a removal of the legacy management application 158.

Figure 3:
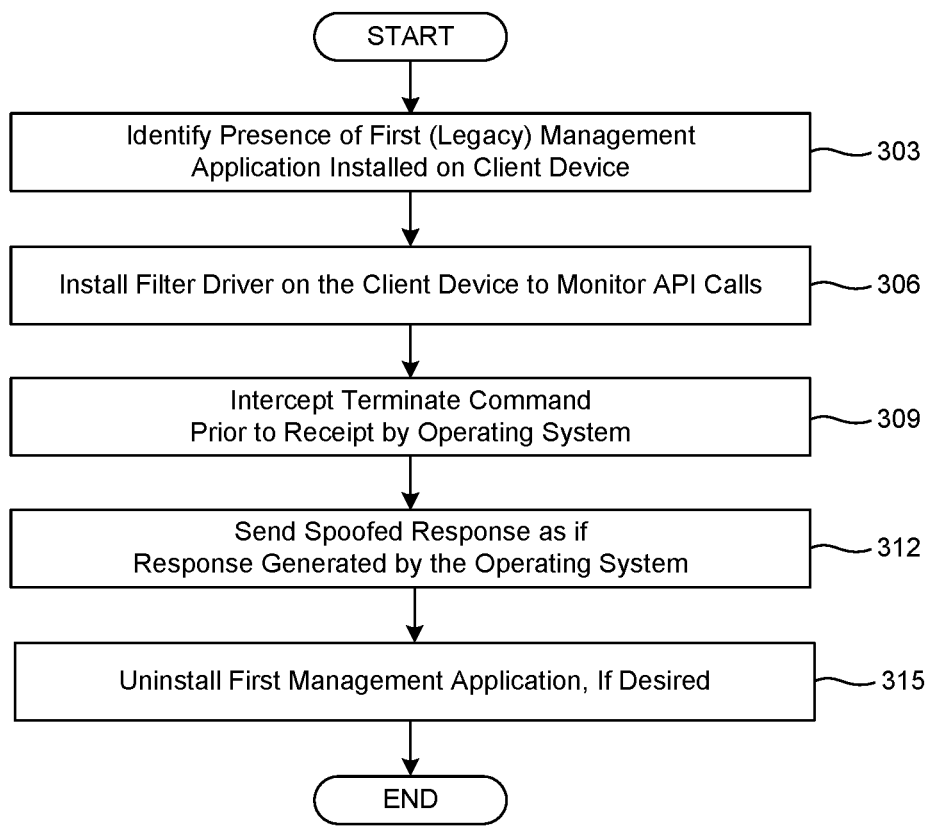
FIG. 3 is a flowchart illustrating functionality implemented by components of the networked environment.

Moving on to FIG. 3, shown is a flowchart that provides one example of the operation of a portion of the client device 106 to provide co-existence of the legacy management application 158 and the management application 124. The flowchart of FIG. 3 can be viewed as depicting an example of elements of a method implemented by the management application 124, a sleeper agent application, or other suitable software component according to one or more examples. The separation or segmentation of functionality as discussed herein is presented for illustrative purposes only.

In step 303, the client device 106 can identify the presence of a first management application installed on the client device 106. The first management application can include, for example, the legacy management application 158. As some legacy management applications 158, such as SCCM, prevent operation of the management application 124 (or other similar client applications 121) on the client device 106, the management application 124 can implement measures for the first management application and a second management application, such as the management application 124, to co-exist on the client device 106.

Next, in step 306, the management application 124 can install a filter driver 161 on the client device 106 to monitor API calls performed by the first management application. For example, the filter driver 161 can monitor for terminate commands 203 generated by the first management application.

In step 309, the filter driver 161 can intercept a terminate command 203 generated by the first management application prior to a receipt of the terminate command 203 by the operating system 127. Hence, the operating system 127 will not terminate execution of the management application 124. In other examples, the terminate command 203 can be intercepted by one of the management application 124 or a sleeper agent application installed on the client device 106.

In step 312, the filter driver 161, or other component, can generate and communicate a spoofed response 209 to the legacy management application 158 as if the terminate command 203 had been generated by the operating system 127 after a successful termination of the second management application. The second management application can continue operating along with the first management application on the client device 106.

In step 315, the first management application, such as the legacy management application 158, can be uninstalled or removed from the client device 106 by the management application 124 if desired, for example, when an enterprise hopes to fully transition from use of first management application to the second management application. In one example, the management application 124 can generate a command line argument that instructs the operating system 127 to initiate a removal of the legacy management application 158. Thereafter, the process can proceed to completion.

Figure 4:
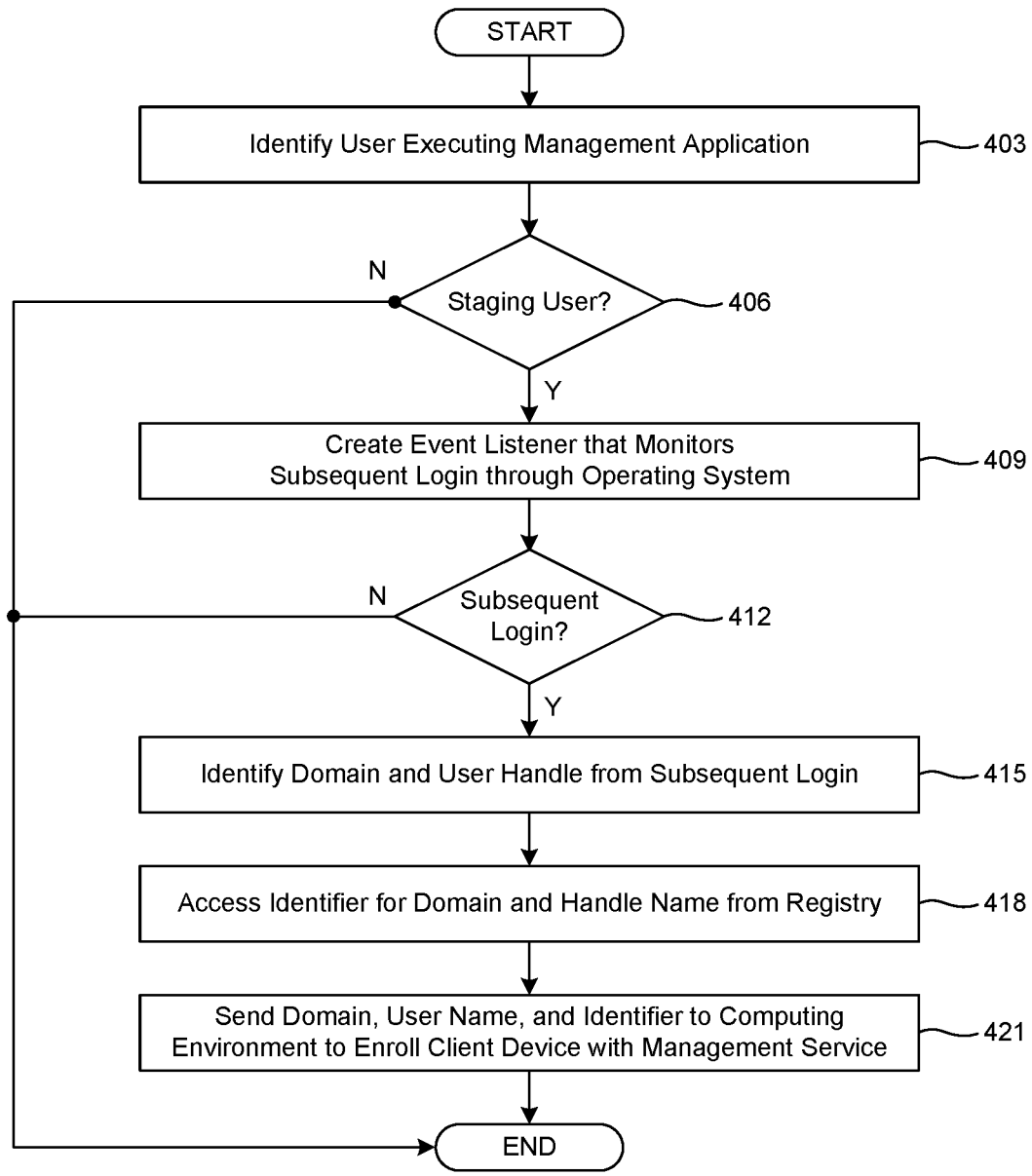
FIG. 4 is a flowchart illustrating functionality implemented by components of the networked environment.

Moving on to FIG. 4, shown is a flowchart that provides one example of the operation of a portion of the client device 106 to provide automatic enrollment of a client device 106. The flowchart of FIG. 4 can be viewed as depicting an example of elements of a method implemented by the management application 124 or other suitable software component according to one or more examples. The separation or segmentation of functionality as discussed herein is presented for illustrative purposes only.

Provisioning can be employed to configure client devices 106 such that, when they are received by an end user, a login to an operating system 127 of the client device 106 causes an automatic enrollment of the client device 106 with the management service 115. In this event, the end user does not have provide login credentials or other complicated data. Instead, the login credentials of the operating system 127 can be employed. In one example, an administrator can provision the client device 106 for an end user by installing the management application 124 on the client device 106.

In step 403, the management application 124 can identify a current user of the operating system 127 to determine, for example, whether the current user of the operating system 127 is a staging user or an end user, such as an intended recipient of the client device 106.

In step 406, the client device 106 can determine whether the current user is a staging user, such as an administrator or other user provisioning the client device 106. In one example, the current user identified by the client device 106 can be communicated to the computing environment 103 and compared against a whitelist of approved administrator. If the current user is not a staging user, the process can proceed to completion.

Alternatively, if the current user is a staging user, the process can proceed to step 409. In step 409, the management application 124 can create an event listener 180 that monitors one or more subsequent logins of a user account performed through the operating system 127 of the client device 106. For instance, when the client device 106 is received by the end user, the event listener 180 can monitor the login to the operating system 127 performed by the end user. As shown in the user interface 169 of FIG. 1, the operating system 127 can require an end user to provide a username, password, or other information before providing the end user with access to a desktop of the operating system 127 or to other features of the client device 106.

In step 412, the event listener 180 can determine whether a subsequent login has been performed. The subsequent login can include, for example, an initial login by an end user, as opposed to subsequent logins by an administrator or other user provisioning the client device 106. To this end, in some examples, the event listener 180 can determine whether a username does not exist in the whitelist of the administrators or other personnel approved to provision a client device 106. If a subsequent login has not been performed, the process can proceed to completion.

Alternatively, if the subsequent login has been performed, the process can proceed to step 415. In some examples, the username can include a domain 183 and a user handle 186. In step 415, during a login through the operating system 127, the domain 183 and the user handle 186 can be identified by the event listener 180. For instance, referring back to FIG. 1, the domain 183 can include "enterprise" while the user handle 186 includes "smith.john." The domain 183 can be indicative of a particular enterprise account managed by the management service 115.

In step 418, the client device 106 can access an identifier 136 associated with the domain 183 and the user handle 186 from a registry of the client device 106. The identifier 136 can uniquely identify the client device 106, for example, in association with a user that operates the client device 106.

In step 421, the client device 106 can send the identifier 136, the domain 183, and the user handle 186 to the computing environment 103 to enroll the client device 106 automatically. For example, the enrollment service 118 can use the domain 183 to identify an enterprise account corresponding to an enterprise, organization, or other entity from the data store 112. Using the enterprise account, the enrollment service 118 can locate an existing user account for the end user from the user account data 133 or generate a new user account. The identifier 136 can be stored in association with the user account such that the client device 106 can be identified by the management service 115 at a later time. For instance, the identifier 136 can be used in subsequent authentications of a user of the client device 106. Thereafter, the process can proceed to completion.

Figure 5:
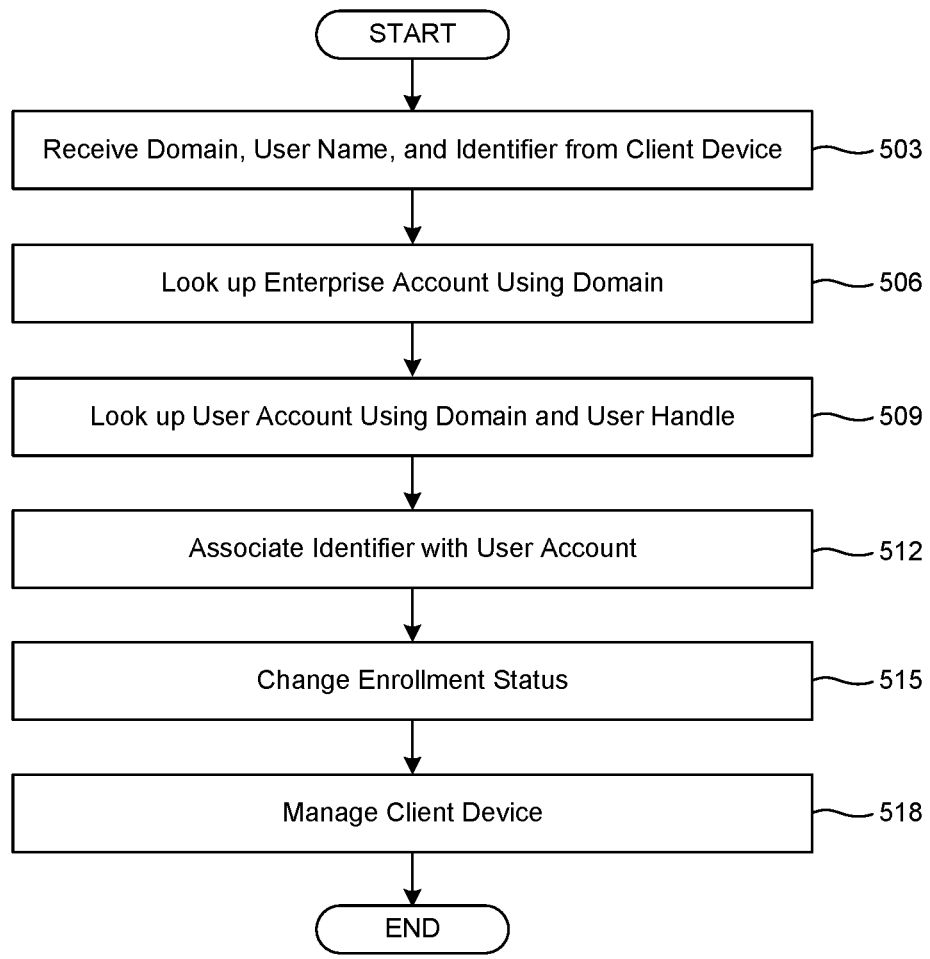
FIG. 5 is a flowchart illustrating functionality implemented by components of the networked environment.

Turning now to FIG. 5, shown is a flowchart that provides one example of the operation of a portion of the computing environment 103 to provide automatic enrollment of a client device 106. The flowchart of FIG. 5 can be viewed as depicting an example of elements of a method implemented by the management service 115, the enrollment service 118 or other suitable software component according to one or more examples. The separation or segmentation of functionality as discussed herein is presented for illustrative purposes only.

In step 503, the computing environment 103 can receive an identifier 136, a domain 183, and a user handle 186 from a client device 106, for instance, to enroll the client device 106 with the management service 115. As noted above, the client device 106 can identify a subsequent login performed on the client device 106, for example, after a provisioning of the client device 106 by an administrator. The client device 106 can use information provided through an operating system 127 login to automatically enroll the client device 106.

In step 506, the computing environment 103 can use the domain 183 to look up an enterprise account corresponding to an enterprise, organization, or other entity from the data store 112. For instance, the computing environment 103 can generate and execute a search query in the data store 112 using the domain 183.

Next, in step 509, the computing environment 103 can look up an existing user account for the end user from the user account data 133 using, for example, the domain 183 and the user handle 186. For instance, the user handle 186 of "smith.john," as shown in the user interface 169 of FIG. 1, can be used to identify a user account for John Smith, an end user of the enterprise account.

In step 512, the identifier 136 can be stored in association with the user account such that the client device 106 can be identified by the management service 115 at a later time. For instance, the identifier 136 can be used in subsequent authentications of a user of the client device 106.

In step 515, the enrollment status 155 can be updated in the data store 112. For instance, the enrollment status 155 can be updated to "enrolled." In other examples, the enrollment status 155 can be updated to reflect that the client device 106 has checked in with the management service 115, but that the client device 106 requires configuration by the management application 124 prior to the enrollment status being updated to "enrolled" or "fully enrolled."

In step 518, the computing environment 103 can be used to manage or oversee operation of the client device 106. For instance, the management service 115, through the management application 124 preinstalled on the client device 106 through provisioning, can cause various software components to be installed on a client device 106. The software components can include, for example, client applications 121, resources, libraries, drivers, device configurations, or other similar components that require installation on the client device 106 as specified by an administrator of the management service 115. The management service 115 can further cause policies to be implemented on a client device 106. Policies can include, for example, restrictions or permissions pertaining to capabilities of a client device 106 such that access to enterprise data is secured on the client device 106. Thereafter, the process can proceed to completion.

Figure 6:
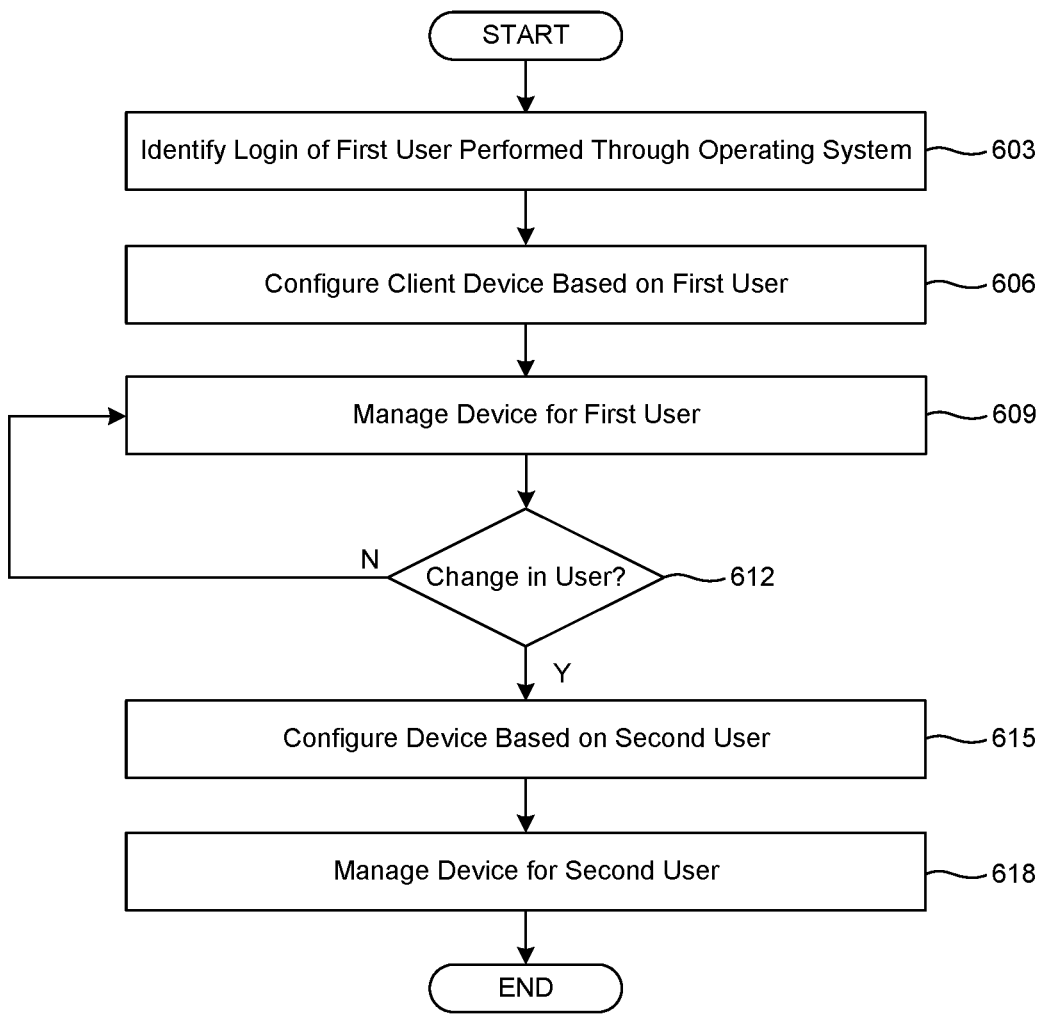
FIG. 6 is a flowchart illustrating functionality implemented by components of the networked environment.

Referring next to FIG. 6, shown is a flowchart that provides one example of the operation of a portion of the client device 106 to provide multiple user device management on a client device 106. The flowchart of FIG. 6 can be viewed as depicting an example of elements of a method implemented by the management application 124 or other suitable software component according to one or more examples. The separation or segmentation of functionality as discussed herein is presented for illustrative purposes only.

Traditionally, the management service 115 only maintains a mapping of a user account to a client device 106. For instance, the data store 112 can include an identifier 136 that uniquely identifies a client device 106. However, in many instances, a client device 106 can be shared among multiple users. For example, a team having multiple employees can share a single client device 106. It is beneficial to manage operation of the client device 106 for each user, as opposed to a single user on a single client device 106.

Beginning with step 603, the client device 106 can identify a login of a first user performed through the operating system 127. For instance, an operating system 127 can require a user to provide a username and password to login to a desktop environment or other form of session offered by the operating system 127. In some examples, the management application 124 can use one or more APIs provided by the operating system 127 to query the operating system 127 to identify a user login event, or to identify an active user of the operating system 127.

Next, in step 606, the management application 124 can configure the client device 106 based at least in part on the first user and the client device 106. For instance, the data store 112 can maintain a mapping of a user account of the management service 115 for each active user of the client device 106. The mapping can be used to access enterprise data 130, configuration profiles 145, compliance rules 148, or other information applicable to the first user. For instance, the mapping can include an identifier 136 that uniquely identifies both the client device 106 as well as a user of the client device 106. In one example, the mapping can resemble the following table structure:

TABLE 1

| Row_No | User_Account_Id | OS_User_Id | Device_Id |
|---|---|---|---|
| ... | ... | ... | ... |
| 105896 | AXY876 | 846X2A | 41350X | where "User_Account_Id" includes an identifier 136 that uniquely identifies a user account of the management service 115, "OS_User_Id" includes an identifier 136 that uniquely identifies an active user of the client device 106, and "Device_Id" includes an identifier 136 that uniquely identifies the client device 106. The "User_Account_Id" can be used to identify other data used to manage the client device 106 or provide access to enterprise data 130.

Next, in step 609, the management application 124 can manage the client device 106 for the first user. For example, the management application 124 can oversee operation of the client device 106 based on user groups 152 that include the first user. This can include, for example, restricting functionality on the client device 106 in accordance with one or more applicable configuration profiles 145, providing enterprise data 130 for the first user, verifying that the client device 106 is in conformance with one or more compliance rules 148, or performing another device management function, as can be appreciated.

Next, in step 612, the client device 106 can determine whether the user has changed. For instance, a first user can log out of the operating system 127 and a second user can thereafter login to the operating system 127 using a username and password different from that of the first user. The management application 124 can use one or more APIs of the operating system 127 to identify a logout event as well as a subsequent login event performed by a second user. If no change in user has been identified, the process can revert to step 609. Alternatively, if a change in user has been identified, the process can proceed to step 615.

In step 615, the management application 124 can configure the client device 106 based on a second user of the operating system 127, where the second user is different from the first user. For instance, one or more configuration profiles 145 for the second user can be identified and used to configure the client device 106. Additionally, suitable enterprise data 130 can be made accessible to the client device 106 based on the new user.

In step 618, the management application 124 can manage the client device 106 for the second user. In some examples, the management application 124 can oversee operation of the client device 106 based on user groups 152 that include the second user. For example, the management application 124 can restrict functionality on the client device 106 in accordance with one or more applicable configuration profiles 145, provide enterprise data 130 for the second user, verify that the client device 106 is in conformance with one or more compliance rules 148, or perform another device management function, as can be appreciated. Thereafter, the process can proceed to completion.

The client devices 106 or devices comprising the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application 121, and potentially other applications. Also stored in the memory can be a data store 112 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display 172 upon which a user interface 169 generated by the client application 121 or another application can be rendered. In some examples, the user interface 169 can be generated using user interface data provided by the computing environment 103. The client device 106 can also include one or more input/output devices that can include, for example, a capacitive touchscreen or other type of touch input device, fingerprint reader, or keyboard.

Although the management service 115, the client application 121, and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FP-GAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
a client device; and
program instructions stored in memory and executable in the client device that, when executed, direct the client device to:
identify a user account active on the client device;
determine whether the user account is a staging user account or an end user account associated with an intended recipient of the client device;
in an instance in which the user account is the staging user account, create an event listener on the client device that monitors a subsequent login of a user account performed through an operating system of the client device, the subsequent login of the user account being the end user account;
identify, by the event listener, a domain and a user handle from the subsequent login; and
in an instance in which the subsequent login of the user account is detected by the event listener, perform an automated enrollment of the client device with a remote management service, wherein the automated enrollment is performed using at least one of the domain and the user handle identified from the subsequent login.

2. The system of claim 1, wherein the automated enrollment comprises sending the domain and the user handle to the remote management service to enroll the client device with the remote management service.

3. The system of claim 2, wherein the remote management service is configured to, in an instance in which the domain and the user handle are received from the client device, identify an existing user account of the remote management service as the end user account or create a new user account based at least in part on the domain and the user handle.

4. The system of claim 1, wherein the event listener is further configured to detect an identifier on the client device that uniquely identifies the client device and send the identifier to the remote management service.

5. The system of claim 4, wherein the identifier is obtained from a registry of the client device.

6. The system of claim 1, wherein the user account is determined as the staging user account based at least in part on a current user identified from an operating system of the client device.

7. The system of claim 1, wherein the domain and the user handle are parsed from an email address obtained during the subsequent login.

8. A method, comprising:
- identifying a user account active on a client device;
- determining whether the user account is a staging user account or an end user account associated with an intended recipient of the client device;
- in an instance in which the user account is the staging user account, creating an event listener on the client device that monitors a subsequent login of a user account performed through an operating system of the client device, the subsequent login of the user account being the end user account;
- identifying, by the event listener, a domain and a user handle from the subsequent login; and
- in an instance in which the subsequent login of the user account is detected by the event listener, performing an automated enrollment of the client device with a remote management service, wherein the automated enrollment is performed using at least one of the domain and the user handle identified from the subsequent login.

9. The method of claim 8, wherein the automated enrollment comprises sending the domain and the user handle to the remote management service to enroll the client device with the remote management service.

10. The method of claim 9, further comprising, in an instance in which the domain and the user handle are received from the client device, identifying, by the remote management service, an existing user account of the remote management service as the end user account or create a new user account based at least in part on the domain and the user handle.

11. The method of claim 8, further comprising detecting, by the event listener, an identifier on the client device that uniquely identifies the client device and sending the identifier to the remote management service.

12. The method of claim 11, wherein the identifier is obtained from a registry of the client device.

13. The method of claim 8, wherein the user account is determined as the staging user account based at least in part on a current user identified from an operating system of the client device.

14. The method of claim 8, further comprising parsing an email address obtained during the subsequent login to identify the domain and the user handle.

15. A non-transitory computer-readable medium embodying program instructions executable in a client device having at least one hardware processor that, when executed by the client device, direct the client device to:
- identify a user account active on the client device;
- determine whether the user account is a staging user account or an end user account associated with an intended recipient of the client device;
- in an instance in which the user account is the staging user account, create an event listener on the client device that monitors a subsequent login of a user account performed through an operating system of the client device, the subsequent login of the user account being the end user account;
- identify, by the event listener, a domain and a user handle from the subsequent login; and
- in an instance in which the subsequent login of the user account is detected by the event listener, perform an automated enrollment of the client device with a remote management service, wherein the automated enrollment is performed using at least one of the domain and the user handle identified from the subsequent login.

16. The non-transitory computer-readable medium of claim 15, wherein the automated enrollment comprises sending the domain and the user handle to the remote management service to enroll the client device with the remote management service.

17. The non-transitory computer-readable medium of claim 16, wherein the remote management service is configured to, in an instance in which the domain and the user handle are received from the client device, identify an existing user account of the remote management service as the end user account or create a new user account based at least in part on the domain and the user handle.

18. The non-transitory computer-readable medium of claim 15, wherein the event listener is further configured to detect an identifier on the client device that uniquely identifies the client device and send the identifier to the remote management service.

19. The non-transitory computer-readable medium of claim 18, wherein:
- the identifier is obtained from a registry of the client device; and
- the user account is determined as the staging user account based at least in part on a current user identified from an operating system of the client device.

20. The non-transitory computer-readable medium of claim 15, wherein the domain and the user handle are identified from an email address obtained during the subsequent login.

* * * * *